US012619501B2

(12) United States Patent
Statton et al.

(10) Patent No.: US 12,619,501 B2
(45) Date of Patent: May 5, 2026

(54) DATA RETRIEVAL USING EMBEDDINGS FOR DATA IN BACKUP SYSTEMS

(71) Applicant: Cohesity, Inc., San Jose, CA (US)

(72) Inventors: Gregory Statton, Huntington Beach, CA (US); Sanjay Poonen, Los Altos, CA (US); Mohit Aron, Saratoga, CA (US); Apurv Gupta, Bengaluru (IN)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/618,695

(22) Filed: Mar. 27, 2024

(65) Prior Publication Data

US 2024/0370339 A1     Nov. 7, 2024

Related U.S. Application Data

(60) Provisional application No. 63/503,631, filed on May 22, 2023.

(30) Foreign Application Priority Data

May 4, 2023     (IN) .............................. 202341031783

(51) Int. Cl.
*G06F 11/1446*     (2026.01)
*G06F 16/13*     (2019.01)
*G06F 16/14*     (2019.01)

(52) U.S. Cl.
CPC ........ *G06F 11/1458* (2013.01); *G06F 16/137* (2019.01); *G06F 16/148* (2019.01); *G06F 2201/84* (2013.01)

(58) Field of Classification Search
CPC .. G06F 11/1458; G06F 16/148; G06F 16/137; G06F 2201/84; G06F 16/2237; G06F 16/24575; G06F 11/1451; G06F 12/0261; G06F 16/215; G06F 16/22; H04L 63/101
USPC .......................................................... 707/654
See application file for complete search history.

(56) References Cited

U.S. PATENT DOCUMENTS

| | | | | |
|---|---|---|---|---|
| 9,135,266 | B1 * | 9/2015 | Makin | G06F 16/1734 |
| 9,384,211 | B1 * | 7/2016 | Castillo | G06F 16/29 |
| 9,921,769 | B2 | 3/2018 | Aron et al. | |
| 9,971,821 | B1 | 5/2018 | Gupta et al. | |
| 10,089,030 | B2 | 10/2018 | Aron et al. | |
| 10,311,083 | B2 | 6/2019 | Gupta et al. | |
| 10,416,911 | B2 | 9/2019 | Aron et al. | |

(Continued)

OTHER PUBLICATIONS

U.S. Appl. No. 18/183,659, filed Mar. 14, 2023, naming inventors Shankar et al.

(Continued)

*Primary Examiner* — Evan Aspinwall
(74) *Attorney, Agent, or Firm* — Shumaker & Sieffert, P.A.

(57) ABSTRACT

In general, techniques for efficient data retrieval from a backup system are described. An example computing system includes one or more storage devices and processing circuitry having access to the one or more storage devices and configured to: process an input to generate a filter, wherein the input indicates a context for one or more queries; apply the filter to backup data to obtain filtered data from the backup data; generate an index of embeddings from the filtered data; process, based on the index of embeddings, a query to generate a response for the query; and output the response.

15 Claims, 7 Drawing Sheets

(56) References Cited

U.S. PATENT DOCUMENTS

| | | | | |
|---|---|---|---|---|
| 10,996,875 | B2 | 5/2021 | Aron et al. | |
| 11,176,165 | B2 | 11/2021 | Gupta et al. | |
| 2018/0329993 | A1* | 11/2018 | Bedadala | G06F 16/90332 |
| 2019/0362008 | A1* | 11/2019 | Miseldine | G06F 9/54 |
| 2021/0256966 | A1* | 8/2021 | Chatterjee | G06N 3/0455 |
| 2022/0004571 | A1* | 1/2022 | Ganapathy | G06F 16/3326 |
| 2022/0334926 | A1* | 10/2022 | Murphy | G06F 16/219 |
| 2023/0055429 | A1* | 2/2023 | Pasternack | G06F 16/9532 |
| 2023/0069958 | A1* | 3/2023 | Oliner | G06F 16/31 |
| 2023/0169271 | A1* | 6/2023 | Shailabh | G06F 40/40 |
| | | | | 704/9 |
| 2023/0274086 | A1* | 8/2023 | Tunstall-Pedoe | G06F 40/56 |
| | | | | 704/9 |
| 2024/0265041 | A1* | 8/2024 | Rennie | G06N 5/04 |
| 2024/0281332 | A1* | 8/2024 | Prahladka | G06F 11/076 |
| 2024/0289863 | A1* | 8/2024 | Smith Lewis | G06N 3/008 |
| 2024/0362208 | A1* | 10/2024 | Naufel | G06F 16/243 |

OTHER PUBLICATIONS

Kent et al., "The power of AI-ready data and Cohesity", Cohesity, Inc., Apr. 13, 2023, 5 pp., URL: https://www.cohesity.com/blogs/the-power-of-ai-ready-data-and-cohesity/.

Laflamme et al., "How generative AI can help you get ahead of data security threats", Cohesity, Inc., Apr. 20, 2023, 7 pp., URL: https://www.cohesity.com/blogs/how-getting-aI-can-help-you-get-ahead-of-data-security-threats/.

International Search Report and Written Opinion of International Application No. PCT/US2024/027012 dated Jul. 15, 2024, 16 pp.

Cohesity, "Unleashing the future of data security, AI, and cloud with Microsoft and Cohesity", 2024, 5 pp., Retrieved from the Internet on Jun. 28, 2024 from URL: https://www.cohesity.com/spotlight-on-security/episode-five/.

Response to Communication Pursuant to Rules 161(1) and 162 EPC dated May 16, 2025, from counterpart European Application No. 24727942.5, filed Nov. 12, 2025, 25 pp.

* cited by examiner

PROCESS AN INPUT TO GENERATE A
FILTER, WHEREIN THE INPUT INDICATES A
CONTEXT FOR ONE OR MORE QUERIES
〜400

APPLY THE FILTER TO BACKUP DATA TO
OBTAIN FILTERED DATA FROM THE
BACKUP DATA
〜405

GENERATE AN INDEX OF EMBEDDINGS
FROM THE FILTERED DATA
〜410

PROCESS, BASED ON THE INDEX OF
EMBEDDINGS, A QUERY TO GENERATE A
RESPONSE FOR THE QUERY
〜415

OUTPUT THE RESPONSE
〜420

DATA RETRIEVAL USING EMBEDDINGS FOR DATA IN BACKUP SYSTEMS

RELATED APPLICATIONS

This application claims the benefits of U.S. Provisional Patent Application No. 63/503,631, filed 22 May 2023, and of India Provisional Patent Application No. 202341031783, filed 4 May 2023; the entire content of each application is incorporated herein by reference.

TECHNICAL FIELD

This disclosure relates to data platforms for computing systems and, more particularly, to data retrieval from backup systems.

BACKGROUND

Data platforms that support computing applications rely on primary storage systems to support latency sensitive applications. A secondary storage system is often relied upon to support secondary use cases such as backup and archive.

Backup data is commonly queried to retrieve specific information or datasets from storage systems, enabling data analysis, data recovery, data mining, forensic analysis, and compliance with regulatory requirements. Many data platform solutions maintain an index or catalog of backed-up data, which facilitates efficient querying of backup data. The data platform enables users to search the backup index based on query criteria, and the data platform executes a query against the backup index, where the query specifies the search criteria and any additional parameters required. The query may involve searching for specific files, folders, databases, email messages, or other types of data stored in a backup. Based on the query results, which can include metadata information describing the backup data, such as file names, sizes, timestamps, and backup versions, the user can select specific data or datasets to retrieve from the backup. This may involve selecting individual objects or entire backups.

SUMMARY

In general, techniques for artificial intelligence (AI)-enhanced and efficient data retrieval from a backup system are described. In some examples, a data platform produces an index of embeddings for filtered backup data stored on a backup system. This index of embeddings may be effectively "scoped" to a context for a set of one or more queries expected from a user or application and, in some cases, may be generated in an on-demand manner based on received inputs. A response generation platform receives an input indicative of context for queries to the response generation platform. A filter generator processes the input to determine types of data relevant to queries. For example, the filter generator may analyze the input using a machine learning model to decode the types of data the user is interested in (e.g., Email data, File Share data, Databases, or other unstructured data). The filter generator may generate a filter unique to the input, based on the decoded data types, and the response generator platform applies the filter to data of backups to create an index of embeddings based on the data that is filtered using the filter generated based on the input. This index of embeddings is then available to drive retrieval augmented generation (RAG) queries of the backup data.

The techniques may provide one or more technical advantages. For example, the techniques may allow customers or other users to make stored backup, archive, or other data "AI-Ready" by creating an index of advanced metadata/embeddings for the stored data and, in some aspects, securing that index through fine-grained role-based access controls. The customers and other users that store backup or other data on a storage system may re-leverage that data using Artificial Intelligence and machine learning models to gain other efficiency elsewhere in their workflows, while keeping the data securely associated with the data platform.

In some examples, the response generation platform is a retrieval-augmented response generation platform that accepts a user or application input, such as a question or a query. The input may be tokenized with some keywords extracted that are used to filter the large of amount of data included the backup data to filter down to a smaller subset of data. The response generation platform then selects representations from within those documents or objects that are most relevant to the user or machine query as an index of embeddings. The index of embeddings is provided, along with the original query, to a Language Model to enable query processor to provide a context-aware response. Additional one or more queries may be received that are relevant to the context indicated by the input, and a query processor may also use an index of embeddings to generate corresponding responses for the one or more queries. This innovative approach allows generated responses to not only be knowledgeable but also diverse and relevant to domain-specific content.

The techniques leverage AI and machine learning, in particular generative AI, to inspect data managed by a data platform and produce new and original content based on that data. Generative AI tools use sophisticated algorithms to assess data and derive novel and unique insights, thereby improving decision-making and streamlining operations. The response generation platform described herein may deliver an end-to-end cloud operational experience that simplifies and transforms Information Technology (IT) operations using a conversation-centric approach that responds to natural language questions with actionable, targeted responses based on data managed by the data platform.

In an example, a computing system comprises: one or more storage devices; and processing circuitry having access to the one or more storage devices and configured to: process an input to generate a filter, wherein the input indicates a context for one or more queries; apply the filter to backup data to obtain filtered data from the backup data; generate an index of embeddings from the filtered data; process, based on the index of embeddings, a query to generate a response for the query; and output the response.

In an example, a method comprises: processing, by a computing system, an input to generate a filter, wherein the input indicates a context for one or more queries; applying the filter to backup data to obtain filtered data from the backup data; generating an index of embeddings from the filtered data; processing, based on the index of embeddings, a query to generate a response for the query; and outputting the response.

In an example, non-transitory computer-readable media comprises instructions that, when executed by processing circuitry, cause the processing circuitry to: process an input to generate a filter, wherein the input indicates a context for one or more queries; apply the filter to backup data to obtain filtered data from the backup data; generate an index of embeddings from the filtered data; process, based on the index of embeddings, a query to generate a response for the query; and output the response.

The details of one or more examples of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
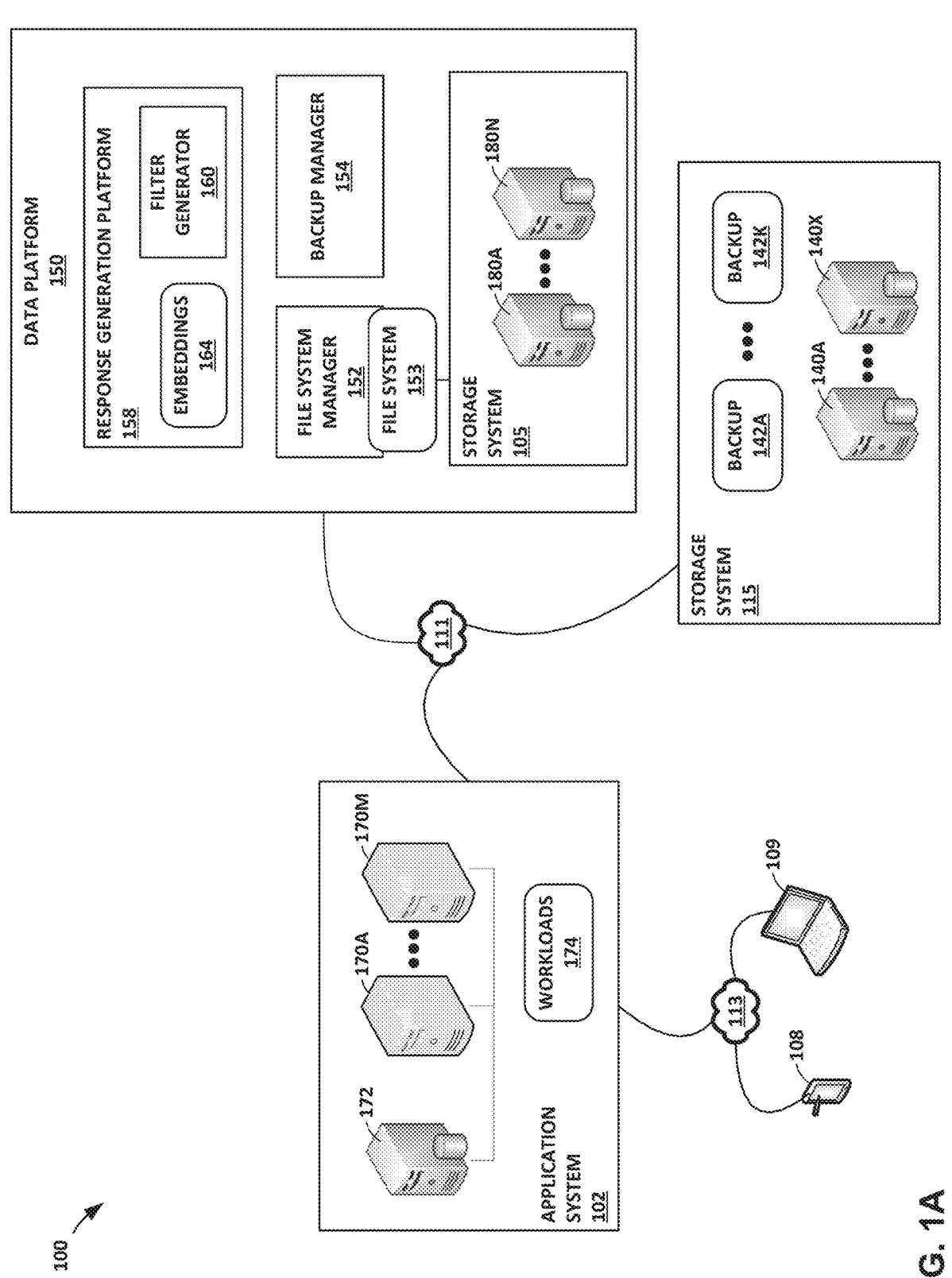
FIGS. 1A-1B are block diagrams illustrating example systems that perform adaptive deduplication of data chunks, in accordance with one or more aspects of the present disclosure.
Figure 1B:
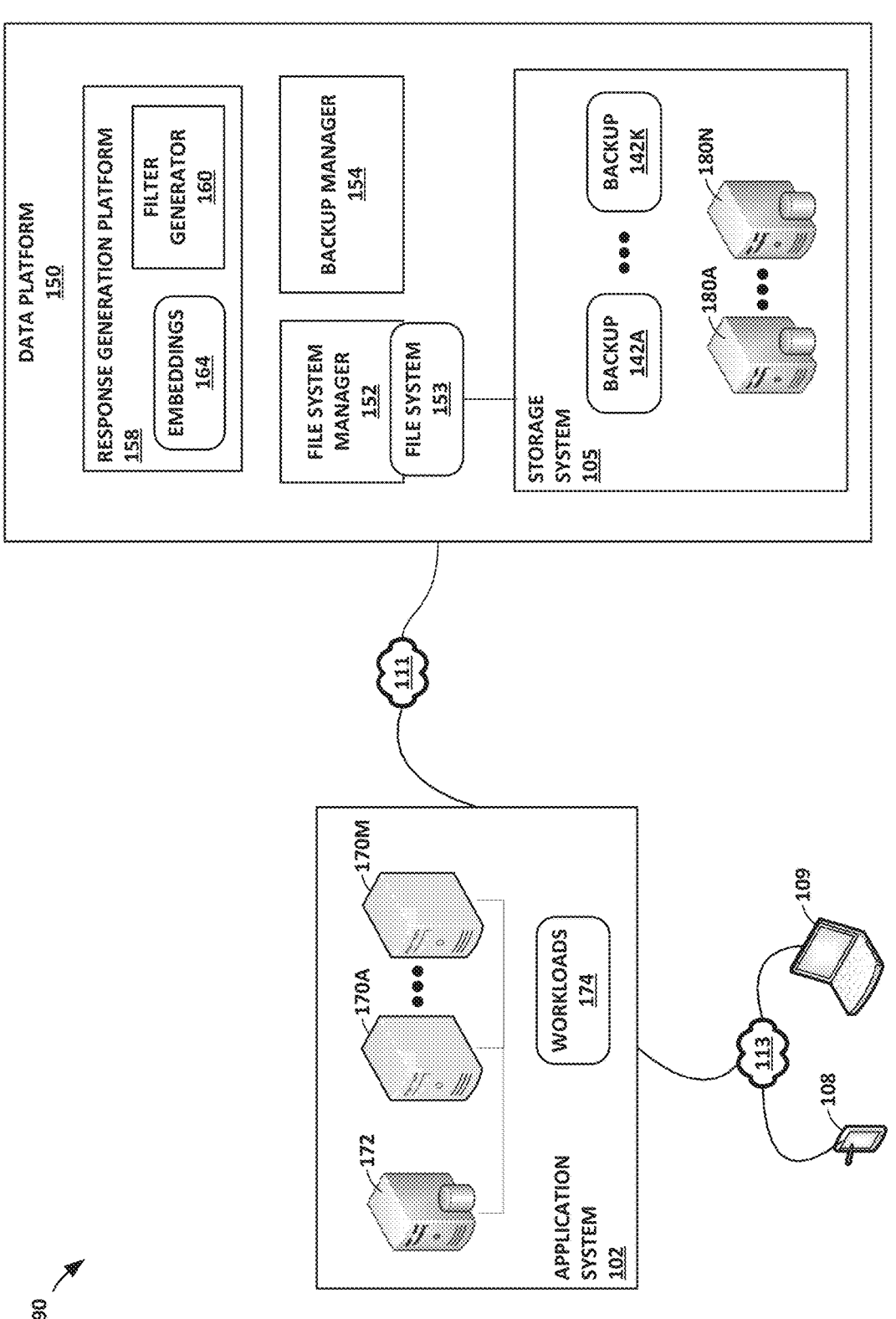

FIGS. 1A-1B are block diagrams illustrating example systems, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.) Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS, Platform-aaS, Infrastructure-aaS, Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may include applications that generate queries to response generation platform 158, for which response generation platform 158 responds using backup data stored at a storage system 105 or storage system 115. Enterprise applications may be delivered as a service from external cloud service providers or other providers, executed natively on application system 102, or both.

In the example of FIG. 1A, system 100 includes a data platform 150 that provides a file system 153 and backup functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may include a redundant array of independent disks (RAID) system, Storage as a service (STaaS), Network Attached Storage (NAS), and/or a Storage rea Network (SAN). In some examples, one or more of storage devices 180 are both compute and storage devices that execute software for data platform 150, such as file system manager 152 and backup manager 154 in the example of system 100, and store objects and metadata for data platform 150 to storage media. In some examples, separate compute devices (not shown) execute software for data platform 150, such as file system manager 152 and backup manager 154 in the example of system 100. Each of storage devices 180 may be considered and referred to as a "storage node" or simply as "node". Storage devices 180 may represent virtual machines running on a supported hypervisor, a cloud virtual machine, a physical rack server, or a compute model installed in a converged platform.

In some examples, data platform 150 runs on physical systems, virtually, or natively in the cloud. For instance, data platform 150 may be deployed to a physical cluster, a virtual cluster, or a cloud-based cluster running in a private cloud, on-prem, hybrid cloud, or a public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy.

Each of network 113 and network 111 may be the internet or may include or represent any public or private communications network or other network. For instance, each of network 113 and network 111 may be a cellular, Wi-Fi®, ZigBee®, Bluetooth®, Near-Field Communication (NFC), satellite, enterprise, service provider, local area network, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/ storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 154, system images, directory information, or other types of objects used by application system 102. These may also be referred to as "backup objects." Objects of different types and objects of a same type may be deduplicated with respect to one another.

Data platform 150 includes backup manager 154 that provides backup of file system data for file system 153. In the example of system 100, backup manager 154 backs up file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for backup and/or archival purposes. Storage system 115 may be alternatively referred to herein as a "backup storage system" or "backup system."

In some examples, storage system 115 may be a storage system deployed and managed by a cloud storage provider and referred to as a "cloud storage system." In some examples, storage system 115 is co-located with storage system 105 in a data center, on-prem, or in a private, public, or hybrid cloud. Storage system 115 may be considered a "backup" or "secondary" storage system for storage system 105 when storage system 105 is a primary storage system. Storage system 115 may be referred to as an "external target" for backups 142A-142K (collectively, "backups 142"). Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup and archive. In general, a file system backup is a copy of file system 153 to support protecting file system 153 for quick recovery, often due to some data loss in file system 153, and a file system archive ("archive") is a copy of file system 153 to support longer term retention and review. The "copy" of file system 153 may include only such data as is needed to restore or view file system 153 in its state at the time of the backup or archive. While the techniques of this disclosure are described primarily with respect to retrieving backup data stored to a secondary storage system, the techniques may be applied with respect to any data stored as a form of backup data to any storage system. For example, backup data can include archive data, replicated data, mirrored data, or snapshots.

Backup manager 154 may back up file system data for file system 153 at any time in accordance with backup policies that specify, for example, backup periodicity and timing (daily, weekly, etc.), which file system data is to be backed up, storage location, access control, and so forth. A backup of file system data corresponds to a state of the file system data at a backup time. Backups 142A-142K (collectively, "backups 142") thus represent time series data for file system 153 in that each backup stores a representation of file system 153 at a particular time. Because file system 153 changes over time due to creation of new objects, modification of existing objects, and deletion of objects, backups 142 will differ. A backup may include a full backup of the file system 153 data or may include less than a full backup of the file system 153 data, in accordance with backup policies. For example, a given backup of backups 142 may include all objects of file system 153 or one or more selected objects of file system 153. A given backup of backups 142 may be a full backup or an incremental backup.

Backups 142 may be used to generate views and snapshots. A current view generally corresponds to a (near) real-time backup state of the file system 153. A snapshot represents a backup state of the primary storage system 105 at a particular point in time. That is, each snapshot provides a state of data of file system 153, which can be restored to the primary storage system 105 if needed. Similarly, a snapshot can be exposed to a non-production workload, or a clone of a snapshot can be created should a non-production workload need to write to the snapshot without interfering with the original snapshot.

Thus, backup manager 154 may use any of backups 142 to subsequently restore the file system (or portion thereof) to its state at the backup creation time, or the backup may be used to create or present a new file system (or "view") based on the backup, for instance. Backup manager 154 may deduplicate file system data included in a subsequent backup against file system data that is included in one or more previous backup. For example, a second object of file system 153 and included in a second backup may be deduplicated against a first object of file system 153 and included in a first, earlier backup.

Backup manager 154 may apply deduplication as part of a write process of writing (i.e., storing) an object of file system 153 to one of backups 142 in storage system 115. Additional description of an example deduplication process is found in U.S. patent application Ser. No. 18/183,659, filed 14 Mar. 2023, and titled "Adaptive Deduplication of Data Chunks," which is incorporated by reference herein in its entirety. A user or application associated with application system 102 may have access (e.g., read or write), via data platform 150, to backup data that is stored in storage system 115.

System 190 of FIG. 1B is a variation of system 100 of FIG. 1A in that data platform 150 stores backups 142 to storage system 105, rather than to storage system 115. System 190 may be deployed where the operator of application system 102 relies on on-premises archiving, for instance.

Backup systems contain a wealth of information for an enterprise, but backups 142 have high access latencies, being stored to slower storage mediums. In addition, in a modern, distributed architecture, it can be complex to collect, collate, and leverage data from workflows across an organization's data estate. Data platform 150 may operate in a myriad of locations, spanning private data centers, single or multiple clouds, SaaS applications hosted by other organizations, and edge locations like stores, Internet-of-Things (IoT) devices, and many other applications. Conventional data platforms may store petabytes (or more) of data without classifying, indexing, or tracking it. This is often referred to as "dark data," and it's typically unknown to the organization and is often unstructured and/or difficult to access. The main challenge with dark data is that it represents a missed opportunity for organizations to gain insights and make informed decisions, dramatically reduce their data costs, and secure and protect data.

With advanced backup systems, backup data can be made readily available to be analyzed and used by machine learning/artificial intelligence applications to drive additional value for users and enterprises. Such advanced backup systems may create an index of embeddings in order for the data to be used in a systematic way. However, this approach can lead to requiring double (or more) the storage space as compared to conventional backups.

In accordance with techniques of this disclosure, data platform 150 of FIGS. 1A-1B may produce an index of embeddings 164 (or "embeddings index 164") for filtered backup data present in backups 142 on a backup system (e.g., storage system 115 or storage system 105), without having to store the complete embeddings for all backups 142. This generated index of embeddings 164 may be effectively "scoped" to a context for a set of one or more queries expected from a user or application and, in some cases, may be generated in an on-demand manner based on received inputs.

Response generation platform 158 receives an input indicative of context for queries to response generation platform 158. This input may itself be a query. Filter generator 160 processes the input to determine types of data relevant to queries. For example, filter generator 160 may analyze the input using a machine learning model to decode the types of data the user is interested in (e.g., Email data, File Share data, Databases, or other unstructured data). Filter generator 160 generates a filter unique to the input, based on the decoded data types, and response generator platform 158 applies the filter to data of backups 142 to create an index of embeddings 164 based on the data that is filtered using the filter generated based on the input. In general, embeddings are simplified representations of more complex data and are useful for similarity searches. The index of embeddings 164 generated for the filtered data from backups 142 is available to drive subsequent retrieval augmented generation (RAG) queries of data in backups 142.

Figure 6:
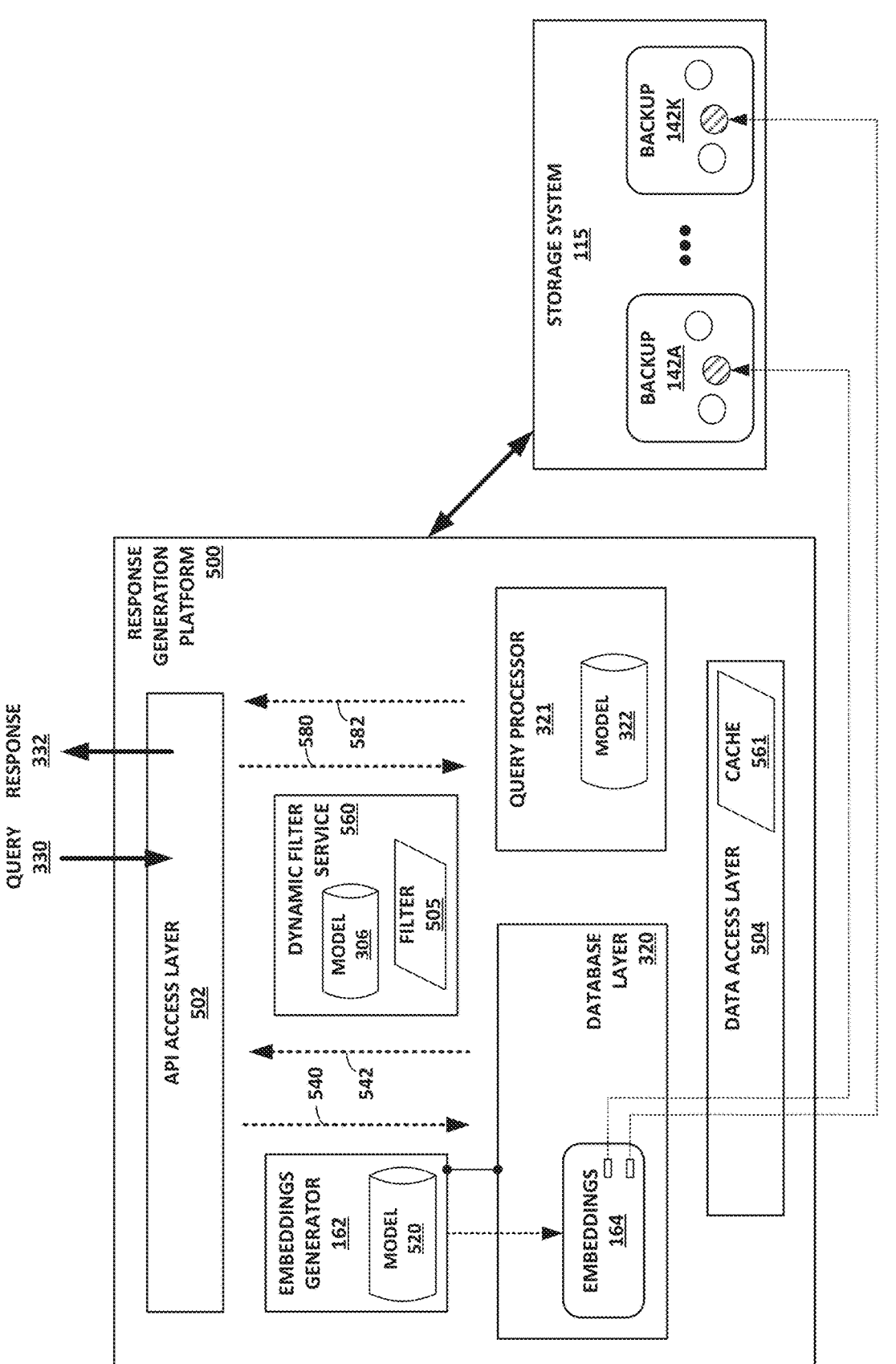
FIG. 6 is a block diagram illustrating a response generation platform, in accordance with one or more techniques of this disclosure.

Computing embeddings may include data conversion to text to obtain embeddings to that are based on text. As a result, data access may include such data conversion, e.g., PDF to text, images to text using character recognition, etc. Response generation platform 158 may create index of embeddings 164 by applying a machine learning model (not shown) based on artificial intelligence or other machine learning techniques. For example, response generate platform 158 may use Word2Vec or Global Vectors for Word Representation (GloVe) for generating embeddings for text data, Recurrent Neural Networks (RNNs)—such as Long Short-Term Memory (LSTM) or Gated Recurrent Unit (GRU) architectures, transformer models, Convolutional Neural Networks (CNNs), Graph Neural Networks (GNNs), autoencoders, Gradient Boosting Machines (GBMs), Deep Neural Networks (DNN), or other artificial neural networks. Response generation platform 158 may apply different techniques for embeddings generation for different types of backup data, e.g., text, images, sequential data, tabular data, graph data, databases, time-series data, email data, file share data, or unstructured data. An example machine learning model 520 for embeddings generation is shown in FIG. 6.

A machine learning system separate from data platform 150 may be used to train a machine learning model for response generation platform 158. The machine learning system may be executed by a computing system. The machine learning system may apply other types of machine learning to train the machine learning model to generate index of embeddings 164 from backup data. For example, the machine learning system may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train the machine learning model.

The techniques may provide one or more technical advantages. For example, generating index of embeddings 164 for data filtered according to a dynamically generated filter may provide a better balance between (1) storage consumption/speed of access and (2) having to create an ephemeral index of embeddings (a time-consuming process) every time a user or application wants to query or engage with associated backup data. Whereas conventional systems continually update the index of embeddings for all data, requiring large amounts of storage space for the index, the techniques may facilitate accurately determining the user's or application's intent and generating the unique filter according to this intent, ensuring that the most relevant data is processed and included in the index of embeddings 164 for query response generation. Because the unique filter may in some cases be generated based on the decoded data types, the filter facilitates efficiently sifting through large quantities of backup data, focusing on the specific data types identified by the machine learning analysis, and ensuring that only relevant data is processed and included in the index of embeddings 164.

Figure 2:
FIG. 2 is a block diagram illustrating example system, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B. One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one storage system 115 is depicted, data platform 150 may apply techniques in accordance with this disclosure using multiple instances of storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of storage system 105. Storage system 105 includes interface module 226, file system manager 152, backup manager 154, policies 159, backup metadata 222, chunk metadata 220, response generation platform 158, and filter generator 160. One or more of the devices, modules, storage areas, or other components of computing system 202 may be interconnected to enable inter-component communications (physically, communicatively, and/or operatively). In some examples, such connectivity may be provided by through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated herein and/or described below, including interface module 226, file system manager 152, backup manager 154, response generation platform 158, and filter generator 160. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of storage system 105 within computing system 202 may store information for processing during operation of computing system 202. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and storage system 105 may retrieve, store, and/or execute the instructions and/or data of one or more applications, modules, or software. Processors 213 and/or storage devices of storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to storage system 105. File system metadata 232 may include one or more trees that describe objects within file system 153 and the file system 153 hierarchy, and can be used to write or retrieve objects within file system 153. File system metadata 232 may reference any of chunk metadata 220 or backup metadata 222, and vice-versa.

File system manager 152 may interact with and/or operate in conjunction with one or more modules of computing system 202, including interface module 226 and backup manager 154.

Backup manager 154 may perform backup functions relating to backing up file system 153, as described above with respect to FIG. 1A. Backup manager 154 may generate one or more backups 142 and cause file system data 230 to be stored in backups 142. Backup manager 154 may generate and manage backup metadata 222 for generating, viewing, retrieving, or restoring any of backups 142. Backup manager 154 may generate and manage chunk metadata 220 for generating, viewing, retrieving, or restoring objects stored as chunks (and references thereto) within chunkfiles, for any of backups 142. Stored objects may be represented and manipulated using logical files for identifying chunks for the objects. Chunk metadata 220 may include a chunk table that describes chunks. The chunk table may include respective chunk IDs for chunks and may contain pointers to chunkfiles and offsets within chunkfiles for retrieving chunks from storage system 115. Chunks are written into chunkfiles at different offsets. By comparing new chunk IDs to the chunk table, backup manager 154 can determine if the data already exists on the system. If the chunks already exist, data can be discarded and metadata for an object updated to reference the existing chunk. Backup manager 154 may use the chunk table to look up the chunkfile identifier for the chunkfile that contains a chunk.

Storing and retrieving backup objects as part of backups 142 is described in U.S. Pat. No. 10,996,875, issued 4 May 2021, and titled "Making More Active Use of a Secondary Storage System," which is incorporated by reference herein in its entirety.

Chunk metadata 220 may include a chunkfile table that describes respective physical or virtual locations of chunkfiles on storage system 115, along with other metadata about the chunkfile, such as a checksum, encryption data, compression data, etc. In FIG. 2, backup manager 154 causes backup metadata 222 and chunk metadata 220 to be stored to storage system 105. In some examples, backup manager 154 causes some or all of backup metadata 222 and chunk metadata 220 to be stored to storage system 115. Backup manager 154, optionally in conjunction with file system manager 152, may use backup metadata 222, chunk metadata 220, and/or file system metadata 232 to restore any of backups 142 to a file system implemented by data platform 150, which may be presented by file system manager 152 to other systems.

Interface module 226 may execute an interface by which other systems or devices may determine operations of file system manager 152 or backup manager 154. Another system or device may communicate via an interface of interface module 226 to specify one or more policies 159.

System 200 may be modified to implement an example of system 190 of FIG. 1B. In the modified system 200, storage system 105 stores backups 142.

Interface module 240 of storage system 105 may execute an interface by which other systems or devices may create, modify, delete, and/or delete backup data for backups 142. Interface module 240 may execute and present an API. The interface presented by interface module 240 may be a gRPC, HTTP, RESTful, command-line, graphical user, web, or other interface.

Although the techniques described in this disclosure are primarily described with respect to a backup function performed by a backup manager of a data platform, similar techniques may additionally or alternatively be applied for an archive, replica, mirror/clone, or snapshot functions performed by the data platform. In such cases, backups 142 would be archives, replicas, mirrors/clones, or snapshots, respectively.

Figure 3:
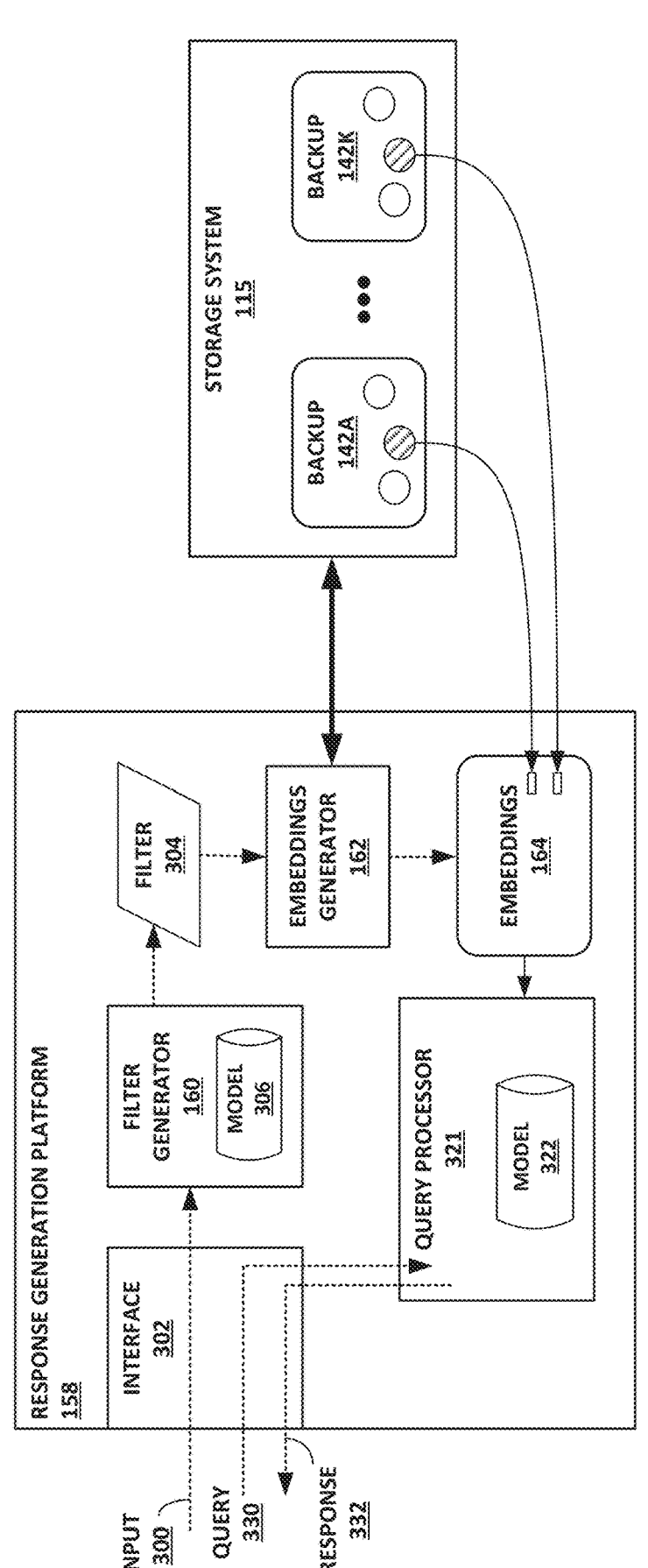
FIG. 3 is a block diagram illustrating an example of response generation platform and operations in further detail.

FIG. 3 is a block diagram illustrating an example of response generation platform 158 and operations in further detail. Response generation platform 158 includes interface module 302, filter generator 160, embeddings generator 162, and query processor 321. Interface module 302 may execute an interface by which other systems or devices may communicate with response generation platform 158. The interface presented by interface module 302 may be a gRPC, HTTP, RESTful, command-line, graphical user, web, or other interface.

Interface 302 receives input 300. Input 300 may include text or other data that indicates context for one or more queries from a user or application. The one or more queries may include input 300.

Filter generator 160 processes input 300 to determine types of data relevant to the queries. For example, filter generator 160 may analyze the input using a machine learning model to decode the types of data the user is interested in. Types of data may be according to file type (e.g., Email data, File Share data, Databases, or other unstructured data), according to association with certain entities (persons, organizations, etc.), according to time or dates, according to topic or semantic similarly, according to context, or other dimensions in which to categorize or characterize data, such as text data. In this example, filter generator 160 applies a machine learning model 306 to analyze input 300 to decode the types of data relevant to the queries. This analysis allows the system to accurately determine the user's intent and tailor the filter 304 accordingly, ensuring that the most relevant data is processed and included in the index of embeddings 164. Machine learning model 306 may include natural language processing (NLP) and deep learning algorithms, for instance.

Filter generator 160 generates a filter 304 based on the decoded data types. Filter 304 is designed to enable response generation platform 158 to efficiently sift through large quantities of backup data in backups 142, focusing on the specific data types identified by the machine learning analysis applied by filter generator 160, and ensuring that only relevant data is processed and included in the index of embeddings 164.

Response generator platform 158 applies filter 304 to backup data of backups 142 to obtain filtered data that is likely relevant to the one or more queries, as indicated by input 300 and determined by filter generator 160. In some cases, input 300 may specify a particular backup of backups 142 as context for the one or more queries (i.e., all filtered data is included in the specified backup).

In some examples, the filtering applied by response generator platform 158 leverages three key concepts: preprocessing, Count Vectorizer, and a Naive Bayes Classifier. First, the index of data for the data backup system 142 is preprocessed. The preprocessing step helps to clean the backup data that is available to be filtered and processed, remove unnecessary noise, and make it suitable for further analysis. The preprocessing includes tokenization, stop word removal, and other text normalization techniques. These improve the overall performance of the machine learning model 306. CountVectorizer is a technique used in natural language processing to transform text data into a matrix of token counts. It effectively creates a bag-of-words representation of the text data, where the occurrence of each word in the dataset is tracked. This structured representation of the text data is then used as input for the machine learning model 306. The Naive Bayes Classifier is a popular probabilistic algorithm for text classification problems. It is based on Bayes' theorem and assumes independence between the features. In the context of the filtering application, the algorithm calculates the probability of different categories or labels for the given text data. It assigns the class with the highest probability to the text, which can be seen as a filtering decision. Where the class/label matches the filter 304 generated by filter generator 160 for input 300, the classified text data is relevant according to input 300.

In summary, the filtering process in this example starts by preprocessing the text data and creating a structured representation using the CountVectorizer. This representation is used as input for the Naive Bayes Classifier, which then calculates the probability of different categories for the text data. The class with the highest probability is chosen as the final label, effectively filtering the text data from backups 142 based on its content.

Data access: Data platform 150 may provide role-based access controls (RBAC) for backup data and prevents users from accessing data they don't have permissions for, such as sensitive data (patient data/PII, trade secrets, financials, and more). Response generation platform 158 may in some examples incorporate RBAC, where filter generator 160 generates filter 304 to filter out data that does not align with users' permissions in order to provide responses that do align to users' permissions.

Embeddings generator 162 processes the obtained, filtered text data that matches the generated filter 304 to generate index of embeddings 164. An embedding is a numerical-typically a vector-representation of a piece of information, for example, text, documents, images, audio, etc. An embedding is a way of representing data as points in n-dimensional space so that similar data points cluster together. In NLP and other forms of artificial intelligence contexts, an embedding can represent text data and be used in text analysis because the embedding is dense in semantic meaning. Embeddings generator 162 obtains items of filtered text data (e.g., files, emails, text objects, etc.), encodes the items as embeddings, and indexes them to generate index of embeddings 164 (sometimes referred to as an embeddings database). Based on index of embeddings 164, query processor 321 processes the query to generate a response. For example, query processor 321 can use index of embeddings 164 to, e.g., perform semantic search of queries against index of embeddings 164 and generate responses for queries based on the semantic search results. Index of embeddings 164 may adhere to a RBAC model allowing for access control over read, write, update, and deletion of the index at a role-level.

Two embeddings are shown as generated from data objects (hashed circles) in backups 142, but index of embeddings 164 may have many millions of embeddings. Any of backups 142 may be presented to response generation platform 158 as a view or snapshot of file system 153 at a point in time. Each of the data objects may be "backup objects" as described in U.S. Pat. No. 10,996,875, referenced elsewhere in this disclosure.

By employing embeddings in the data retrieval process, response generation platform 158 can efficiently and accurately identify relevant data points based on their semantic meaning and relationships, rather than relying solely on traditional keyword-based search methods. This allows for a more nuanced and comprehensive understanding of queries, leading to improved data retrieval results and overall system performance.

In a further aspect of the invention, index of embeddings 164 is made available to drive RAG queries, and other such AI/ML application usage from the user of application. RAG is a framework that combines pre-trained sequence-to-sequence (seq2seq) models with a dense retrieval mechanism, allowing for the generation of more informed and contextually relevant output. This allows users and applications to retrieve data in a secure and efficient manner, without compromising the integrity of the system or the data itself. The RAG queries are also tailored to the specific data types identified by the machine learning analysis, ensuring that users and applications can quickly and easily access the desired information.

In the era of artificial intelligence, off-the-shelf trained large language models (LLMs) have emerged as a powerful tool for generating human-like responses in various applications. However, most existing knowledge-grounded conversation models rely on out of date materials that could be individual documents related to the topic of a conversation, limiting LLMs' ability to generate diverse and knowledgeable responses that could involve more proprietary or domain-specific. To overcome this challenge, the concept of RAG has been introduced, which combines the strengths of LLMs with the ability to retrieve information from multiple documents. RAG not only enables LLMs to generate more knowledgeable, diverse, and relevant responses but also offers a more efficient approach to fine-tuning these models. By using RAG to determine what to respond with and fine-tuning to guide how to respond, LLMs can deliver a more engaging and informative conversational experience.

Data platform 150 may provide robust and domain-specific context to RAG-driven AI systems. By leveraging the robust file system 153, data platform 150 incorporating response generation platform 158 incorporates (or enables) 'AI Ready' for RAG-assisted large language models (LLMs) through an on-demand index of embeddings 164 that are provided just-in-time to the application requesting the data. The data may be secured through RBAC control models.

In some examples, response generation platform 158 is a retrieval-augmented response generation platform that accepts a user or application input 300, such as a question or a query. As described above, input 300 may then be tokenized with some keywords extracted that are used to filter the large of amount of data included an enterprise's backup data (e.g., backups 142—such backup data can be many petabytes) to filter down to a smaller subset of data. Response generation platform 158 then selects representations from within those documents or objects that are most relevant to the user or machine query as index of embeddings 164. The index of embeddings 164 is provided, along with the original query, to the Language Model (such as GPT4) (e.g., model 322) to enable query processor 321 to provide a context-aware response 332. Additional one or more queries 330 may be received that are relevant to the context indicated by input 300, and query processor 321 may also use index of embeddings 164 to generate corresponding responses 332 for the one or more queries 330. This innovative approach allows generated responses to not only be knowledgeable but also diverse and relevant to an enterprise's domain-specific content. Query processor 321 and model 322 may be third-party applications. Query processor 321 and model 322 may be executed using public, private, or hybrid cloud infrastructure separate from other components of response generation platform 500 and separate from storage system 115.

Multiple indexes of embeddings 164 may be generated and stored concurrently for different inputs 300 and corresponding sets of additional one or more queries 330. For example, a first user may provide a first instance of input 300 for which response generation platform 158 generates a first instance of index of embeddings 164, and a second user may provide a second, different instance of input 300 for which response generation platform 158 generates a second, different instance of index of embeddings 164. Response generation platform 158 uses the respective indexes of embeddings 164 to generate responses for respective queries from the first and second user.

By leveraging RAG on top of an enterprise's own dataset, a customer will not need to perform costly fine-tuning or initial training to teach the Language Models (e.g., model 322) 'what' to say. This saves time, money, as well as a reduced environmental impact because an enterprise's dataset is constantly changing and evolving. Leveraging RAG provides the most recent and relevant context to any query. The techniques may also enable responses that are based on any point in time (if reflected in a given one of backups 142), thus enabling versioning analysis of objects "in-flight".

Both automatic and human evaluation results with a large-scale dataset show that response generation platform 158 can generate more knowledgeable, diverse, and relevant responses compared to off-the-shelf LLMs without duplicating or massively increasing the data storage requirements. This breakthrough has significant implications for the future of Enterprise Conversational Q&A and Search & Discovery models for their applications in various industries.

The introduction of RAG-driven AI systems presents a unique opportunity to leverage the power of data-driven insights and enhance the quality of conversations across various platforms. Using data platform 150 enhanced by response generation platform 158, organizations can unlock new levels of efficiency, innovation, and growth.

Response generation platform 158 represents a significant leap forward in the realm of knowledge-grounded conversations. By using the power of multiple documents and incorporating both the topic and local context of a conversation, this approach can generate more knowledgeable, diverse, and relevant responses than ever before. As a result, businesses and technology executives can capitalize on the potential of RAG-driven AI systems to transform the way customers, partners, and employees are engaged, driving innovation and growth in the process.

Put another way, the techniques of this disclosure may enable RAG from backup data. Data retrieval techniques are important for extracting relevant information from large datasets, making these methods critical in the process of data management and recovery. Traditional approaches to data retrieval are insufficient in generating accurate and contextually rich responses. RAG is a seq2seq model incorporating a question encoder and a generator. This advanced model pairs pre-trained seq2seq models (e.g., model 322) with an efficient retrieval mechanism, enabling the production of contextually relevant and informative outputs.

The input 300 is encoded by the question encoder (e.g., filter generator 160) during the forward pass and is subsequently transferred to a retriever (described above with respect to response generation platform 158) that extracts pertinent context documents. These documents are added to the input before being processed by the generator. RAG can work in tandem with a RagRetriever for end-to-end generation or be combined with a retriever's outputs through several steps.

RAG can be applied to backup data from a data protection solution. By incorporating RAG into the data management and recovery process, more accurate and context-aware responses can be generated, improving the overall efficiency and effectiveness of the system.

Advantages

RAG offers numerous advantages, including:

a. Improved data retrieval accuracy: RAG generates more relevant and accurate responses based on the retrieved context documents.

b. Context-aware responses: By leveraging the retriever mechanism, RAG provides more contextually rich outputs.

c. Efficient data management: RAG offers a more effective data management process by integrating advanced sequence-to-sequence models and data retrieval mechanisms.

The techniques of this disclosure may provide one or more advantages over traditional data retrieval methods in Backup Systems and artificial intelligence applications. These advantages may include:

1. Improved efficiency: By generating a unique filter 304 and creating an index of embeddings 164 on-demand or "on the fly," the system can quickly and efficiently process large quantities of backup data to be made available for RAG queries or other AI/ML applications, ensuring that users can access the information they need without significant delays.

2. Enhanced security: The implementation of RBAC ensures that users and applications can only access data for which they have the appropriate permissions, protecting sensitive information from unauthorized access.

3. Scalability: The system is designed to handle large quantities of backup data, making it suitable for use in a wide range of advanced filesystems and artificial intelligence applications.

4. Flexibility: The on-demand nature of the index of embeddings 164 allows users and application to access the data they need when they need it, without having to wait for lengthy processing times or rely on pre-generated indexes that require large amounts of storage.

5. Automatic cleanup: The system automatically cleans up the index of embeddings 164 after a specific time has elapsed or the number of times the index is used drops below a threshold, ensuring that the system remains efficient and does not become bogged down with outdated or unused indexes.

The techniques of the disclosure in this way may provide for efficient and secure data retrieval in advanced filesystems and artificial intelligence applications. By generating a unique filter and creating an index of embeddings on the fly, the system allows users to access the data they need quickly and securely, while also ensuring that the system remains efficient and scalable.

Figure 4:
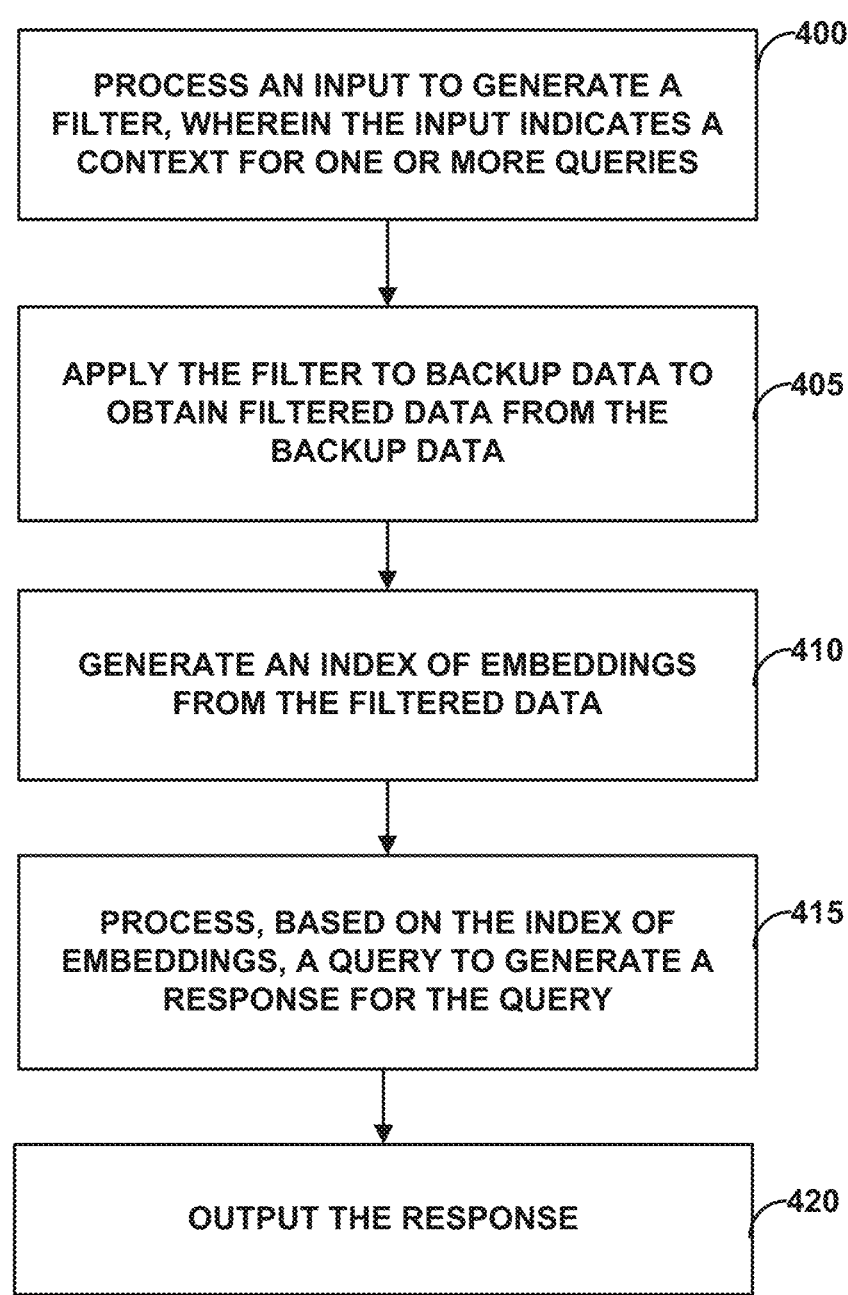
FIG. 4 is a flow diagram illustrating an example operation of a computing system, in accordance with one or more techniques of this disclosure.

FIG. 4 is a flow diagram illustrating an example operation of a computing system, in accordance with one or more techniques of this disclosure. As seen in the example of FIG. 4, computing system 202 initially may process an input to generate (or otherwise obtain) a filter, wherein the input indicates a context for one or more queries (400). Next, computing system 202 may apply the filter to backup data to obtain filtered data from the backup data (405). Next, computing system 202 may generate an index of embeddings from the filtered data (410). Next, computing system 202 may process, based on the index of embeddings, a query to generate a response for the query (415). Next, computing system 202 may output the response (420).

Figure 5:
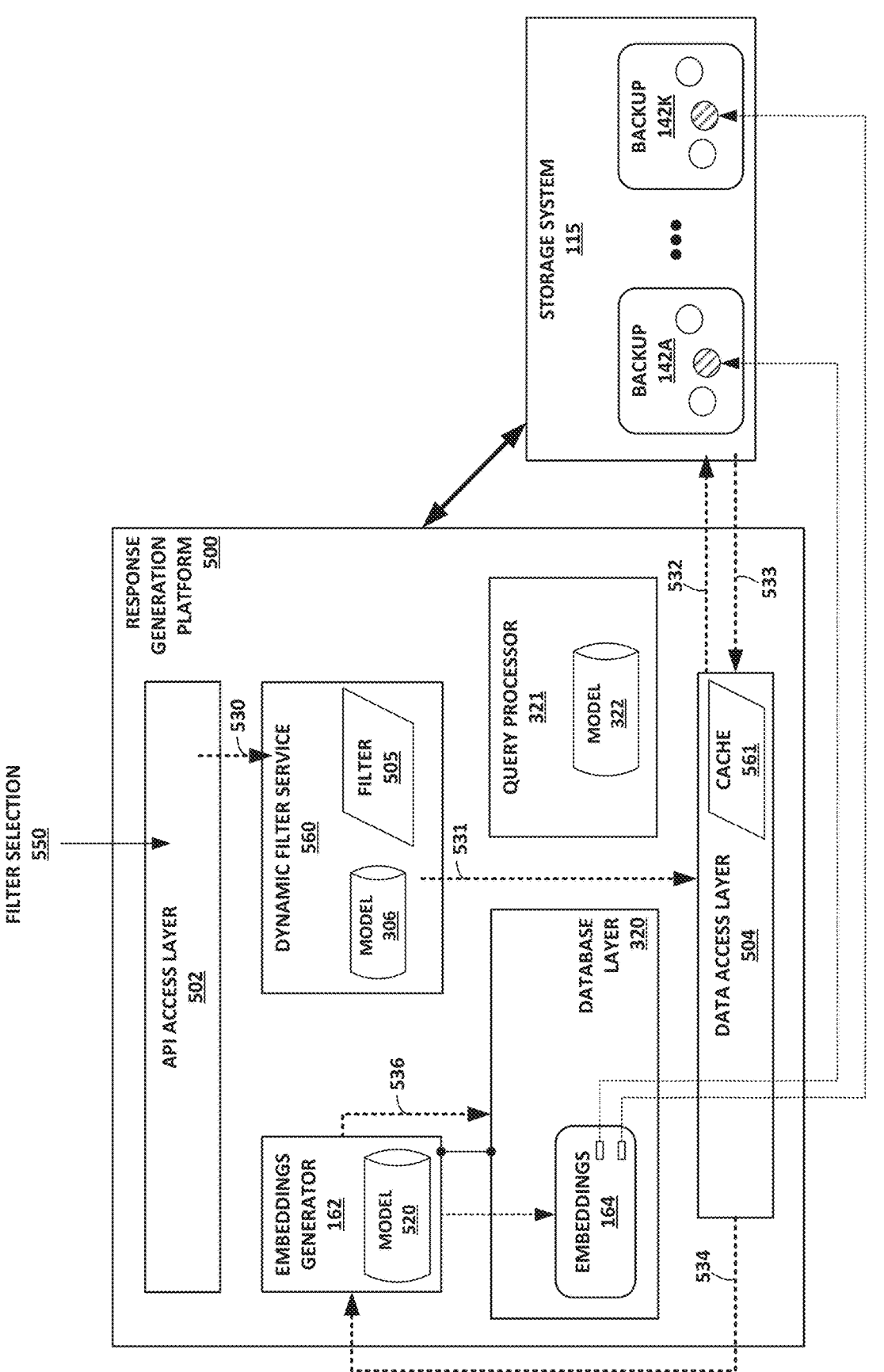
FIG. 5 is a block diagram illustrating an example response generation platform, in accordance with one or more techniques of this disclosure.

FIG. 5 is a block diagram illustrating an example response generation platform, in accordance with one or more techniques of this disclosure. Response generation platform 500 is another example of a response generation platform and may execute on a computing system similar to computing system 202 of FIG. 2, in like manner to response generation platform 158. Like response generation platform 158, response generation platform 500 includes embedding generator 162, embeddings 164, and query processor 321.

Response generation platform 500 includes data access layer 504, dynamic filter service 560, database layer 320, embeddings generator 162, and API access layer 502. API access layer 502 may be used to generate a filter 505 to identify data to be vectorized and/or take an input query 330 and return related context from the data stored by database layer 320 in embeddings 164. To interact with AI Applications that can use private/enterprise data sets, response generation platform 500 (and other response generation platforms described herein) may deliver additional context for a query 330. This context retrieval leverages data access layer 504, dynamic filter service 560, database layer 320, embeddings generator 162, and API access layer 502. Database layer 320 is used in conjunction with a data access layer 504, which accesses the individual files, folder, and entire data sets that are results from filter 505 that is applied to the data in storage system 115. Filter 505 may be generated by either an end-user or an automated system, e.g., dynamic filter service 560. Dynamic filter service 560 may be an example instance of filter generator 160. Filtered data is retrieved from data access layer 504, e.g., as a view or snapshot of file system 153 or filtered portion thereof at a particular time. The filtered data is presented to database layer 300. Embeddings generator 162 uses a vector database (not shown) along with a machine learning model 520 to calculate embeddings 164 for the data. Machine learning model 520 may be a language model. These embeddings 164, along with the data and metadata will be stored in the vector database of database layer 320. Examples of machine learning models, including language models, are described elsewhere in this document.

Data access layer 504 is configured to receive an input and return data from storage system 115 based on the dataset/filter 505 that was requested as the input to data access layer.

Dynamic filter service 560 is configured to receive an input and convert it into a filter (e.g., filter 505) when requesting data from data access layer 504. This filter 505 can be manually specified (e.g., a user manually selects a backed up workload or a view), or dynamically derived from an intent (e.g., 'I need all emails for the last 90 days.'). For example, FIG. 5 depicts filter selection 550 which may indicate a manual specification of desired data or an intent. Filter selection 550 may include filter 505.

Embeddings generator 162 receives data as an input and returns an array of floating point numbers as a vector representation of that data. Computing embeddings for data is described elsewhere in this document. Index of embeddings 164 may be per-tenant, per-account, or per-user, where storage system 115 stores data for multiple tenants/accounts/ users. Data access layer 504 may perform RBAC with respect to datasets stored to storage system 115 to provide responses that align to tenant/account/user permissions. Embeddings generator 162 may be scalable to additional workloads for new filter selections 550. For example, response generation platform 500 may spawn an additional instance of embeddings generator 162 for computing embeddings for a newly retrieved filtered dataset retrieved by data access layer 504. Database layer 320 (including embeddings 164) may be sharded across multiple instances. In some cases, additional instances may be executed at third-party compute nodes (e.g., in a public cloud).

Database layer 320 is configured to insert new entries of vectors/embeddings into embeddings 164 or be queried with an embedding/vector to return n-entries of approximate nearest neighbor from the submitted embedding.

API access layer 502 is configured to receive an input query 330 (shown in FIG. 6) to match context from the embeddings 164 and data access layer 504. API access layer 502 may also be configured to receive input for creating the dynamic filter 505, as described above.

FIG. 5 depicts a process of filter provision/generation and embeddings generation. A user/administrator or application (via API access layer 502) by sending filter selection 550 can use response generation platform 500 to provide or generate (by dynamic filter service 560) a filter 505 which can be applied to a dataset stored to storage system 115 (530). Filter 505 is interpreted by dynamic filter service 560 and sent to data access layer 504 (531) to retrieve data satisfying filter 505 from the dataset (532). The dataset may be one of backups 142, for instance, or another dataset. Once filtered by application of filter 505 and retrieved by data access layer 504 (533), embeddings generator 162 applying model 520 (534) processes the filtered dataset through a vectorization engine to catalog the filtered dataset and store the resultant vectors into a vector database with subsequent metadata (536). This vector database of vectors is depicted in FIG. 5 and described elsewhere in this document as index of embeddings 164 having embeddings. An entry into the vector database can either contain the full file, part of a file, or location of the file along with the embedding itself. Additional metadata may be added, such as file location (for citation purposes supporting a response to a query) and Access Control List (ACL) information. Index of embeddings 164 that is created can now function and interact with post-processing interactions such as answering user questions ("queries"). In some examples, data access layer 504 is configured to redact personally identifiable information from data retrieved from storage system 115.

At step 536, in some aspects, database layer 320 may either save the data/text chunks into embeddings 164 or save a reference link to the data for retrieval.

FIG. 6 is a block diagram illustrating a response generation platform, in accordance with one or more techniques of. FIG. 6 depicts a query/response process involving response generation platform 500. A user or application sends query 330 to API access layer 502. In general, query 330 indicates a question that needs to be answered, a request for information, a directive, or other information that is to be answered using data stored to storage system 115. API access layer 502 computes an embedding of query 330, and API access layer 502 uses database layer 320 querying index of embeddings 164 to calculate the approximate nearest neighbor(s) to query 330 (540), and database layer 320 returns the relevant dataset of indices (542). The dataset of indices returned will indicate the nearest neighbor(s) embeddings and metadata about the embeddings mapped in index of embeddings 164, such as the filename, location, and access information (user/group ownership). This metadata can then be passed to the data access layer 504, which will retrieve the references files and/or objects and return them to API access layer 502. Once the collection of files and/or objects are obtained, the relevant context "{context}" is extracted from them and used in the construction of a prompt for model 322. Once the lookups have happened the system prepares the payload (prompt) and sends the payload to query processor 321 (580).

An example prompt for the payload sent to query processor 321 is as follows:
1) user_msg="Answer the user-provided question based only on the context provided question: {question} context: {context}"
2) The inputted {question}.
3) The {context} that was obtained from the index of embeddings 164 search. This is the top n chunks of data/text that matched the artificial neural network query.

The lookup by database layer 320 from index of embeddings 164 may return the relevant paragraphs/chunk of data (if stored in index of embeddings 164) or a pointer/offset to the data's location (which data access layer 540 may obtain and append into the prompt). This cooperation between database layer 320 and data access layer 502 in this way provides an on-demand data payload from a backup or file storage system 115 for use by AI-driven applications, without having to create embeddings in advance for all data stored to storage system 115. Query processor 321 applies model 322 to the prompt and returns an evaluated answer (582). API access layer 504 includes the answer in response 332.

In some examples, data access layer 504 is configured to cache all or some portion of a dataset retrieved from storage system 115. Cache 561 represents a storage cache within data access layer 504 that stores, for future queries, data from storage system 115. Data access layer 504 optionally stores all or selected data from a retrieved, filtered dataset. In some examples, filter selection 550 includes an indication to persist all or selected data from a retrieved dataset having been filtered based on filter 505 corresponding to filter selection 550. Data access layer 504 uses cache 561 to persist the data in response to this indication. The indication may specify a timeframe for persistence, e.g., a day, or until the user completes a session with API access layer 502. In some examples, cache 561 may be included in the index of embeddings 164 database or other data structure. In addition, index of embeddings 164 may be updated to reference cached data rather than (or in addition to) referencing a location in storage system 115. In some examples, data access layer 504 may store selected data in cache 561 according to historical data indicating frequency of retrieval of various files and objects from storage system 115. For instance, more frequently used data for answering queries may be cached more frequently and/or for longer time.

In some examples, a user may provide the data to be queried in association with a query. Response generation platform 500 may provide this data to the user via API access layer 502.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/ or firmware.

The invention claimed is:

1. A computing system comprising:

one or more storage devices; and processing circuitry having access to the one or more storage devices and configured to:

process an input received from a user or application, the input comprising a natural language query and indicative of a context for one or more queries subsequently expected from a user or application, to dynamically generate a filter;

apply the dynamically generated filter to backup data to obtain filtered data from the backup data;

encode the filtered data to generate an embedding for each item of the filtered data;

generate, from the generated embeddings, an on-demand index of embeddings for the filtered data filtered according to the dynamically generated filter;

process, based on the on-demand index of embeddings, a subsequent retrieval augmented generation (RAG) query to generate, by a language model, a context-aware response for the subsequent RAG query;

output the context-aware response; and based on at least one of a determination that a period of time has elapsed since the generation of the on-demand index of embeddings or a determination that a number of times the on-demand index of embeddings is used over a period of time is below a threshold, delete the on-demand index of the embeddings.

2. The computing system of claim 1, wherein the dynamically generated filter specifies one or more of a file type, an association with an entity, a date, a time, or a topic.

3. The computing system of claim 1, wherein to dynamically generate the filter the processing circuitry is configured to:

tokenize the backup data to generate preprocessed text data;

apply a CountVectorizer to the preprocessed text data to compute a matrix of token counts;

process the matrix of token counts with a machine learning model to classify items of the preprocessed text data to any of a plurality of classes.

4. The computing system of claim 3, wherein to apply the dynamically generated filter the processing circuitry is configured to:

include, in the filtered data, items of preprocessed text data that are assigned a class that matches the filter.

5. The computing system of claim 1, wherein to dynamically generate the filter the processing circuitry is configured to:

apply a role-based access control to at least one of the subsequent RAG query or to the filter generation.

6. The computing system of claim 1, wherein to process the subsequent RAG query the processing circuitry is configured to:

apply retrieval augmented generation using the subsequent RAG query and the on-demand index of embeddings to generate the context-aware response for the subsequent RAG query.

7. The computing system of claim 1, wherein the input further comprises the subsequent RAG query.

8. The computing system of claim 1, wherein the processing circuitry is configured to receive the subsequent RAG query after the on-demand index of embeddings is generated.

9. The computing system of claim 1, wherein the processing circuitry is configured to store at least a portion of the backup data to a cache.

10. The computing system of claim 9, wherein the processing circuitry is configured to generate or modify an embedding of the on-demand index of embeddings with a reference to corresponding backup data for the embedding stored to the cache.

11. The computing system of claim 9, wherein the processing circuitry is configured to process, based on the on-demand index of embeddings and the cache, a second subsequent RAG query to generate a context-aware response for the second subsequent RAG query.

12. A method comprising:

processing, by a computing system, an input received from a user or application, the input comprising a natural language query and indicative of a context for one or more queries subsequently expected from a user or application, to dynamically generate a filter;

applying the dynamically generated filter to backup data to obtain filtered data from the backup data;

encoding the filtered data to generate an embedding for each item of the filtered data;

generating, from the generated embeddings, an on-demand index of embeddings for the filtered data filtered according to the dynamically generated filter;

processing, based on the on-demand index of embeddings, a subsequent retrieval augmented generation (RAG) query to generate, by a language model, a context-aware response for the subsequent RAG query;

outputting the context-aware response; and based on at least one of a determination that a period of time has elapsed since the generation of the on-demand index of embeddings or a determination that a number of times the on-demand index of embeddings is used over a period of time is below a threshold, deleting the on-demand index of the embeddings.

13. The method of claim 12, wherein processing the subsequent RAG query comprises applying retrieval augmented generation using the subsequent RAG query and the on-demand index of embeddings to generate the context-aware response for the subsequent RAG query.

14. The method of claim 12, further comprising:

storing at least a portion of the backup data to a cache;

generating or modifying an embedding of the on-demand index of embeddings with a reference to corresponding backup data for the embedding stored to the cache; and processing, based on the on-demand index of embeddings and the cache, a second subsequent RAG query to generate a context-aware response for the second subsequent RAG query.

15. Non-transitory computer-readable media comprising instructions that, when executed by processing circuitry, cause the processing circuitry to:

process an input received from a user or application, the input comprising a natural language query and indicative of a context for one or more queries subsequently expected from a user or application, to dynamically generate a filter;

apply the dynamically generated filter to backup data to obtain filtered data from the backup data;

encode the filtered data to generate an embedding for each item of the filtered data;

generate, from the generated embeddings, an on-demand index of embeddings for the filtered data filtered according to the dynamically generated filter;

process, based on the on-demand index of embeddings, a subsequent retrieval augmented generation (RAG) query to generate, by a language model, a context-aware response for the subsequent RAG query;

output the context-aware response; and based on at least one of a determination that a period of time has elapsed since the generation of the on-demand index of embeddings or a determination that a number of times the on-demand index of embeddings is used over a period of time is below a threshold, delete the on-demand index of the embeddings.

* * * * *